United States Patent [19]

Spurr

[11] 4,233,021
[45] Nov. 11, 1980

[54] PLASTIC BOTTLE FORMING MACHINE

[75] Inventor: Robert Spurr, West Hartford, Conn.

[73] Assignee: Emhart Industries, Inc., Farmington, Conn.

[21] Appl. No.: 891,859

[22] Filed: Mar. 30, 1978

[51] Int. Cl.² .............................................. B29C 17/07
[52] U.S. Cl. .................................. 425/525; 264/538; 425/533; 425/534
[58] Field of Search ............ 264/94, 97, 523, 537–539; 425/533, 534, 525

[56] References Cited

U.S. PATENT DOCUMENTS

| | | | |
|---|---|---|---|
| 2,789,312 | 4/1957 | Borer | 425/533 X |
| 3,421,179 | 1/1969 | Maiwurm | 264/538 X |
| 3,850,562 | 11/1974 | Takeuchi et al. | 425/533 X |
| 3,857,660 | 12/1974 | Flynn et al. | 425/533 X |
| 3,944,643 | 3/1976 | Sato et al. | 264/538 X |

Primary Examiner—Jan H. Silbaugh
Attorney, Agent, or Firm—A. W. Breiner

[57] ABSTRACT

A plastic bottle forming machine and process wherein a parison is formed in a parison mold utilizing a neck ring and a core rod, and after the core rod has been removed and the parison mold opened, the neck ring is rotated, carrying the parison into alignment with a blow mold. The blow mold is closed and utilizing a blow head the parison is blown to the desired configuration. The blow mold and the parison mold are split molds with halves carried by a pair of relatively movable platens. There is one neck ring for each parison and blow mold with the neck rings being oscillated 180° upon each actuation of the machine and, upon each actuation of the machine, a parison is formed and a previously formed parison is blow molded.

19 Claims, 23 Drawing Figures

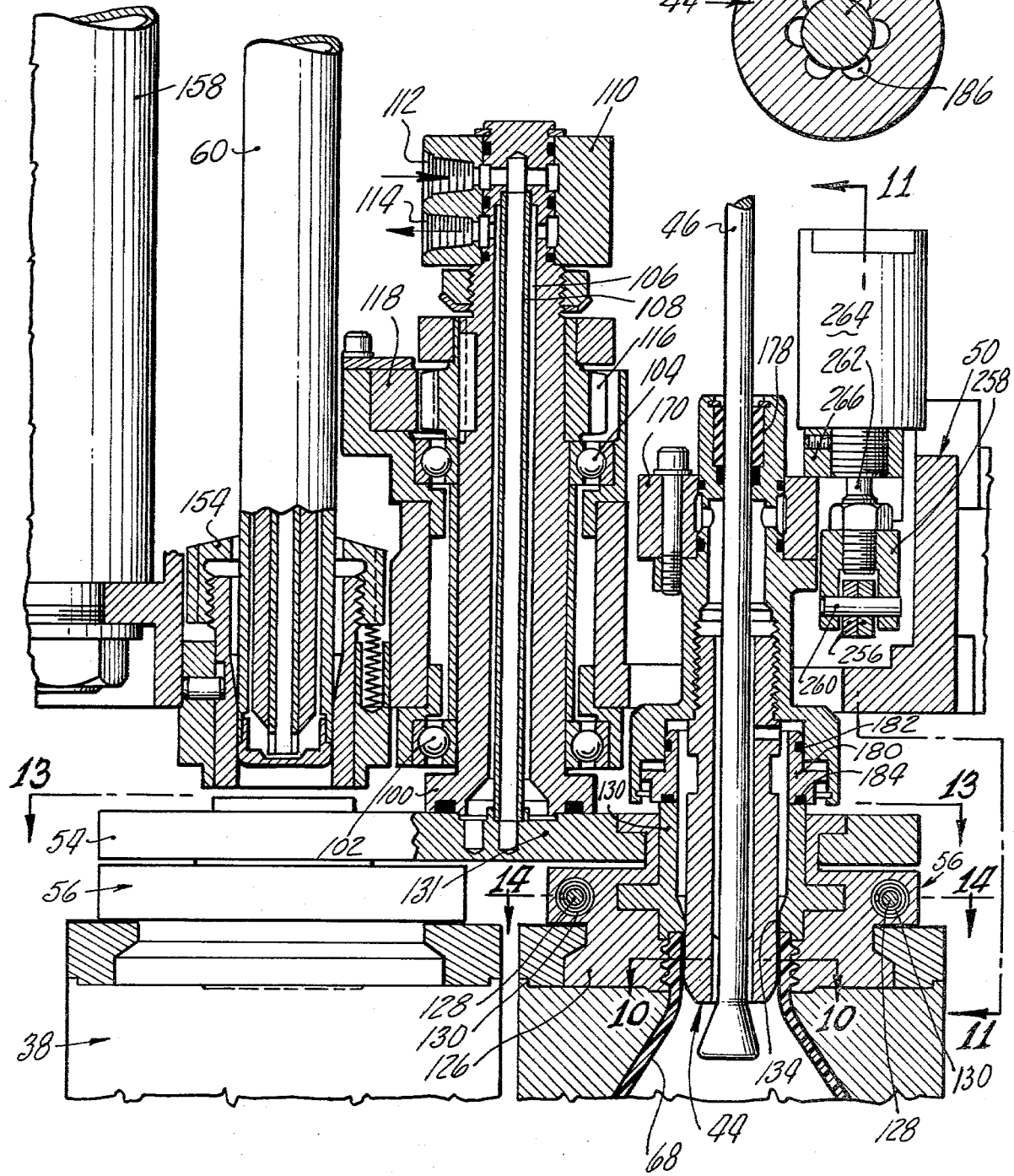
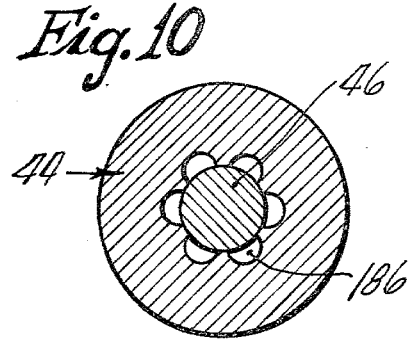
Fig. 9
Fig. 10

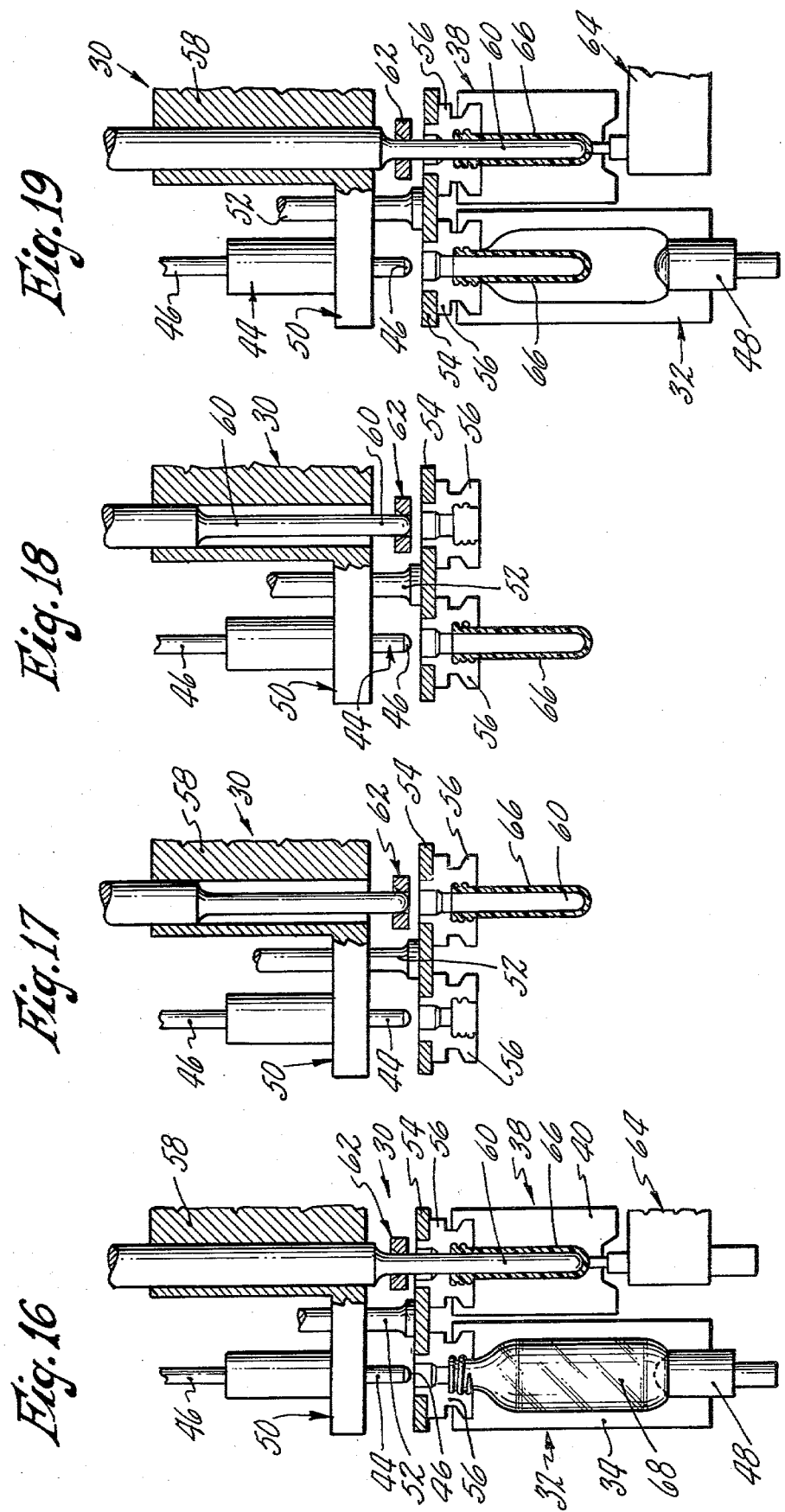

PLASTIC BOTTLE FORMING MACHINE

This invention relates in general to new and useful improvements in plastic bottle forming machines and to a process of making plastic bottles. More particularly the invention is directed to a molding machine and process wherein a parison is formed in a parison mold by injection molding, and thereafter that parison is transferred into a blow mold for blowing of the parison to the desired configuration.

It is well known in the molding art to form blow molded articles, such as plastic bottles, by first forming a plastic parison in a parison mold and then transferring that plastic parison on the core pin into a blow mold and then blow molding such parison. However, machines for the formation of plastic bottles have been complex and have had various disadvantageous features, including their slowness of operation and low production.

In accordance with this invention, there is provided a molding machine and process which employs simultaneous parison injection and final blow molding to obtain optimum productivity per mold set.

Another feature of the invention is the utilization of a blow head which includes a stretch rod with the blow head and stretch rod being so arranged to permit great flexibility in the amplitude of the stroke of the stretch rod which in turn permits good axial stretch of the parison as well as pinning of the bottom of the parison to the bottom of the blow mold prior to the final blowing of the article, thereby providing a high degree of biaxial orientation as well as good sidewall and thickness control.

Another feature of the invention is complete and uniform temperature control of neck rings, parison core and both injection and blow mold bodies for optimum steady state cycle time. These temperature controls permit quick start-up of the machine.

Another feature of the invention is that both parison mold axis and blow mold axis are vertical for uniform material and thermal distribution.

Another feature of the invention is that a minimum of mold tooling is required. A complete machine may include one blow mold, one parison mold, two neck rings, one core rod and one blow head including one stretch rod.

Another feature of the invention is that one core rod operates exclusively with one parison mold and, accordingly, the core rod adjustment including alignment can be individually set for that mold.

A still further feature of this invention is that the core rod is not required to have stretch and blow devices and thus can be devoted exclusively to shape and core thermo control.

A further feature of the invention is that the close proximity of the blow mold to the parison mold permits use of small transfer movement of the parison, reducing parison distortion by reducing velocity and inertia effects.

The above and other objects which will hereinafter become apparent are accomplished by the present invention as will be more clearly understood by reference to the following detailed description, the appended claims and the several views illustrated in the accompanying drawing.

IN THE DRAWING

FIG. 9 is an enlarged fragmentary transverse sectional view taken through an upper part of the machine and shows the specific mounting of the rotatable support for the neck rings and details of the blow head and core rod and the guiding thereof.

FIG. 10 is an enlarged fragmentary transverse sectional view taken along the line 10—10 of FIG. 9 and shows specifically the mounting of the stretch rod in the blow head.

FIGS. 16 through 23 are schematic vertical sectional views showing the general operating steps of the machine.

Figure 1:
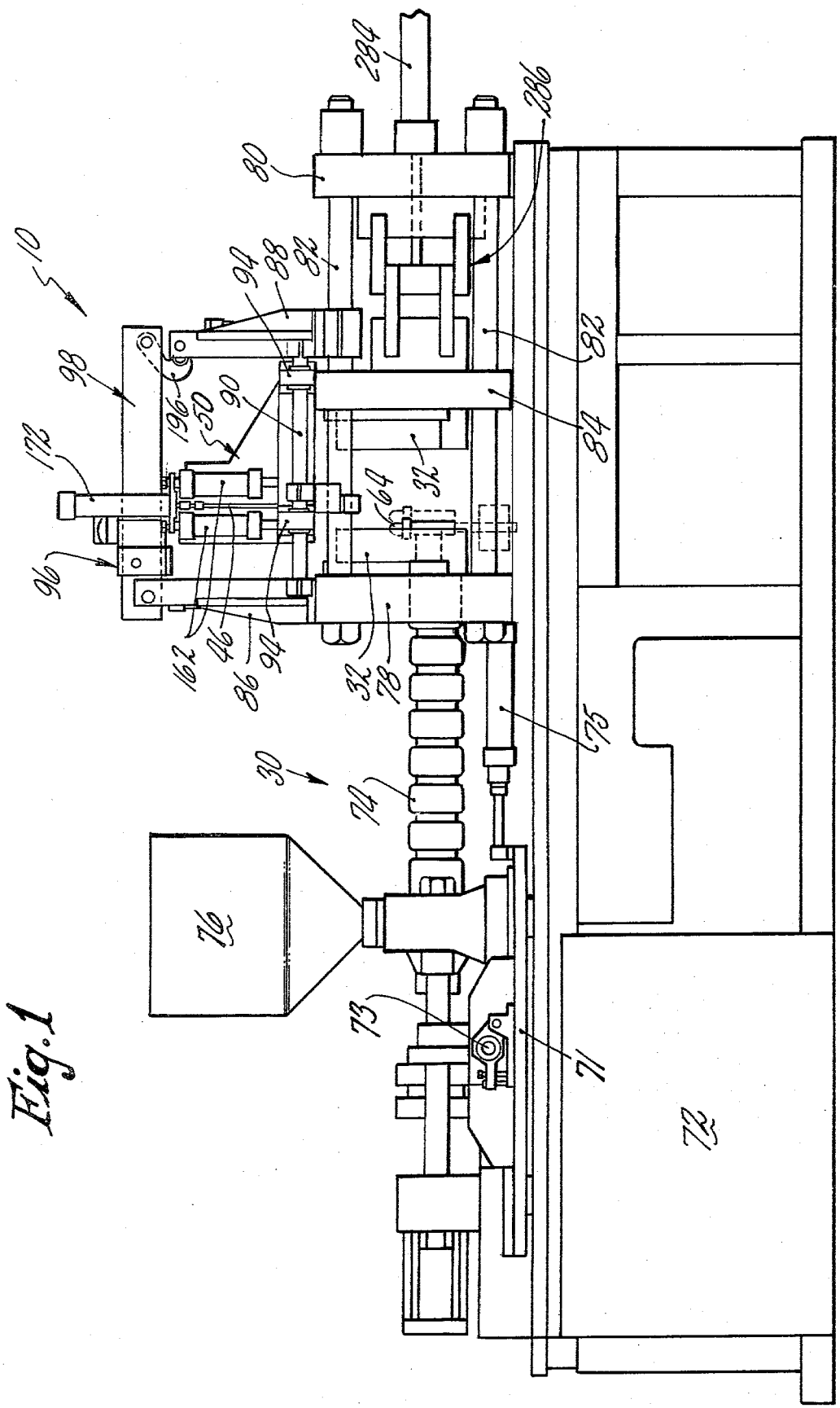
FIG. 1 is generally a schematic side elevational view of the molding machine and shows generally the details thereof.

The general purpose, operation and structure of the machine may be best understood by first referring to the schematic views shown in FIGS. 16 through 23. It is to be understood that the machine, which is generally identified by the numeral 30, will include at least one blow mold 32 which includes a fixed half 34 and a movable half 36 (note FIG. 3). Disposed immediately adjacent the blow mold 32 is a parison mold, generally identified by the numeral 38 with the parison mold 38 also being of a split construction and including a fixed half 40 and a movable half 42 (note FIG. 3). The fixed mold halves 34, 40 are so mounted on platen 78 that their faces are coplanar and they are in closely adjacent relation. It is also to be understood that the movable mold halves 36 and 42 will be carried by a movable platen 84 which in one position will effect the closing of the molds 32,38 and in the other position will effect the opening of those molds.

The machine 30 also includes a blow head, generally identified by the numeral 44. The blow head 44 is positioned in alignment with the axis of the mold 32. The blow head 44 includes an extensible stretch rod 46.

Also fixed with respect to the axis of the mold half 34 is a bottom plate or plug 48 which is particularly configurated to define the shape of the bottom of a bottle to be blown. The bottom plate 48 is mounted for axial movement into and out of the cavity of the mold 32.

The machine 30 includes a carrier 50 which will be mounted for movement toward and away from the mold halves 34,40. The carrier 50 has rotatably journalled therein a shaft 52 which, in turn, carries a support 54. The support 54 carries a pair of split neck rings 56 which are disposed symmetrical with respect to the axis of the shaft 52. The carrier 50 also carries a guide 58 which has a core rod 60 guidedly mounted therein for axial movement. The core rod 60 is also guided by a guide unit 62 disposed above the support 54 and movable with the carrier 50.

In accordance with this invention, in a first position of the machine 30, the molds 32,38 are closed and the core rod 60 is positioned within the parison mold 38. Plastic material is injected into the bottom of the parison mold 38 by an injection apparatus 64 which is fixed relative to the mold half 40. The injection of plastic into the parison mold 40 results in the formation of a parison 66 about the core rod 60.

The mold halves 36,42 are then moved away from the mold halves 34, 40 a preset distance. The carrier 50 is moved in the same direction away from the mold halves 34, 40 a distance substantially half the above preset distance. At such time the newly formed parison 66 is separated from the parison mold 38, but is still retained both within the associated neck ring 56 and on the core rod 60 which permits the parison 66 to remain substantially free of distortion. Then the core rod 60 is pulled out of the newly formed parison 66 so that the parison 66 is supported solely by the neck ring 56. Immediately following this, the support 54 is indexed 180° so that the parison 66 is now positioned between the blow mold halves 34,36 and the other of the neck rings 56 is positioned in alignment with the core rod 60, as is best shown in FIG. 18.

Referring now to FIG. 19, it will be seen that the molds 32, 38 have been closed with the parison 66 now being within the blow mold 32. The core rod 60 is extended through the respective neck ring 56 into the parison mold 38 and a new parison 66 is injection molded within the mold 38 utilizing the injection apparatus 64. It is also to be understood that the bottom plate 48 has moved to its up position.

Figure 20:
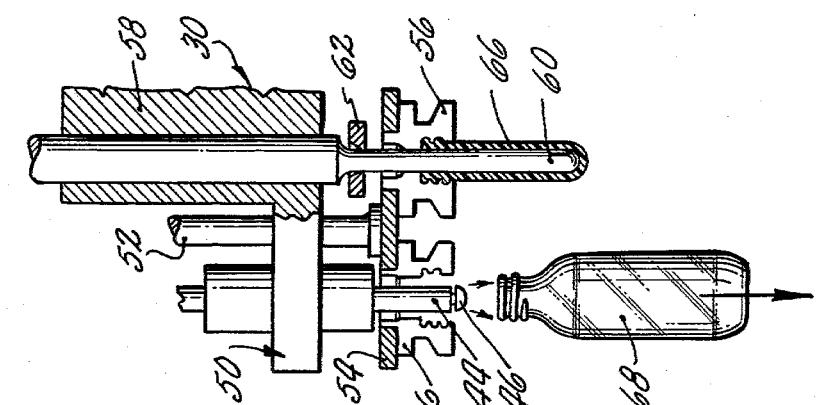
Figure 21:
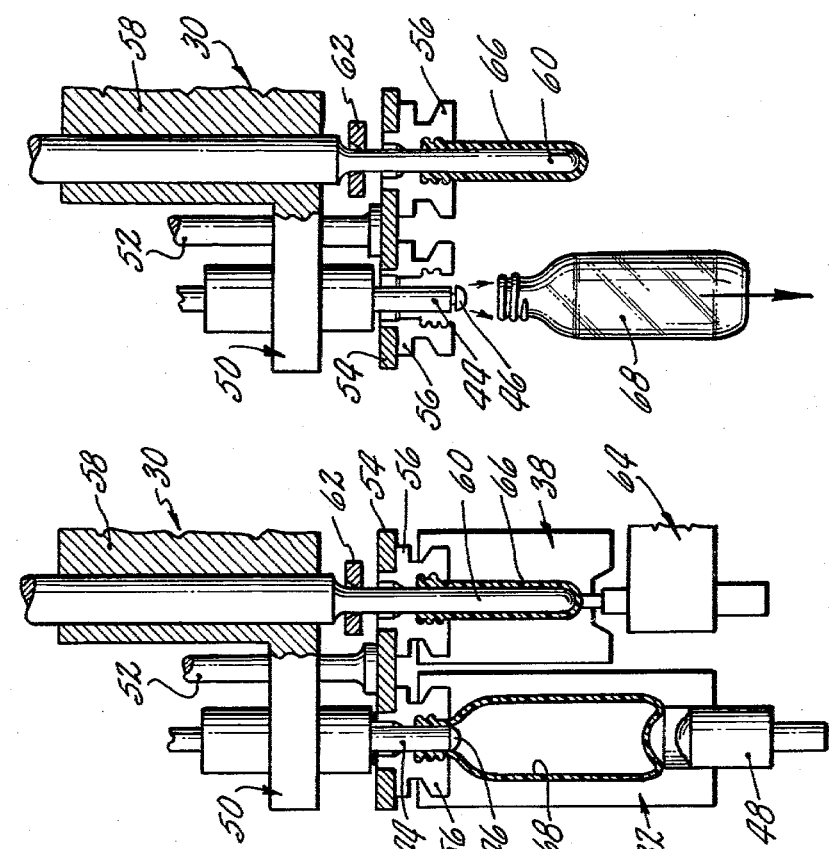

As shown in FIG. 20, while the injection of plastic material into the mold 38 is being performed, stretch rod 46 is being moved downwardly in mold 32 and at the same time, the blow head 44 is being moved down into sealing engagement with the parison 66. As soon as the stretching of the parison 66 is completed, blow air is introduced into the stretched parison to effect the blowing thereof to blow the parison 66 to the configuration of the blow mold 32, as is shown in FIG. 21. A plastic bottle 68 is thus formed in accordance with this invention. As will be apparent, it at times may be desirable to introduce some blowing air into the parison during the stretching operation, in order to prevent collapse of the parison onto the stretch rod.

Figure 22:
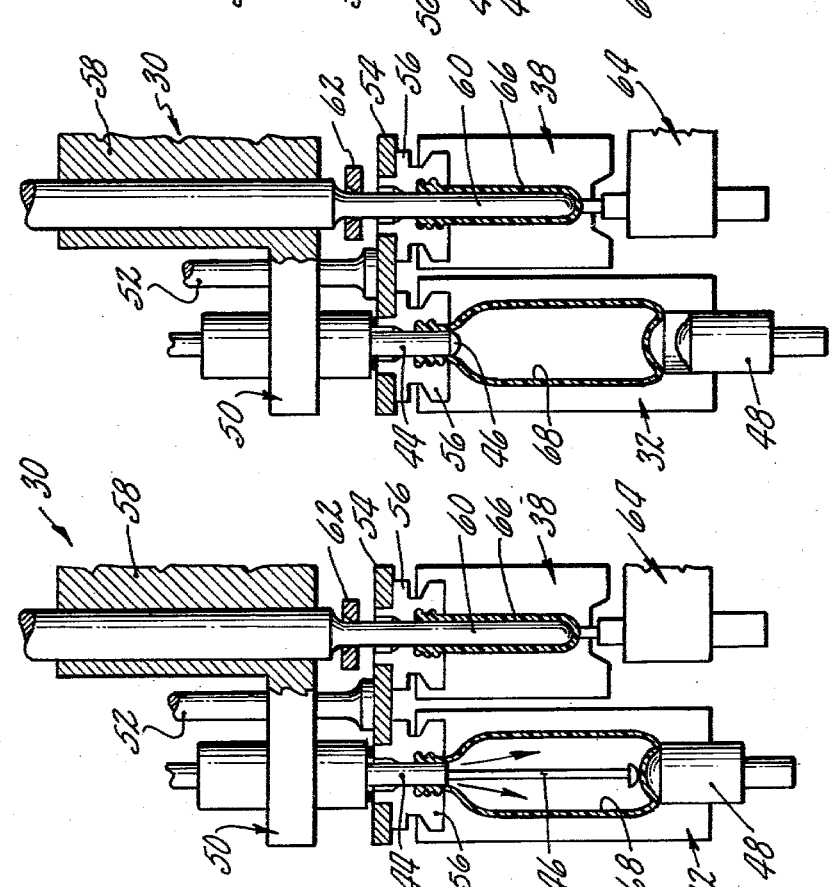
Figure 23:
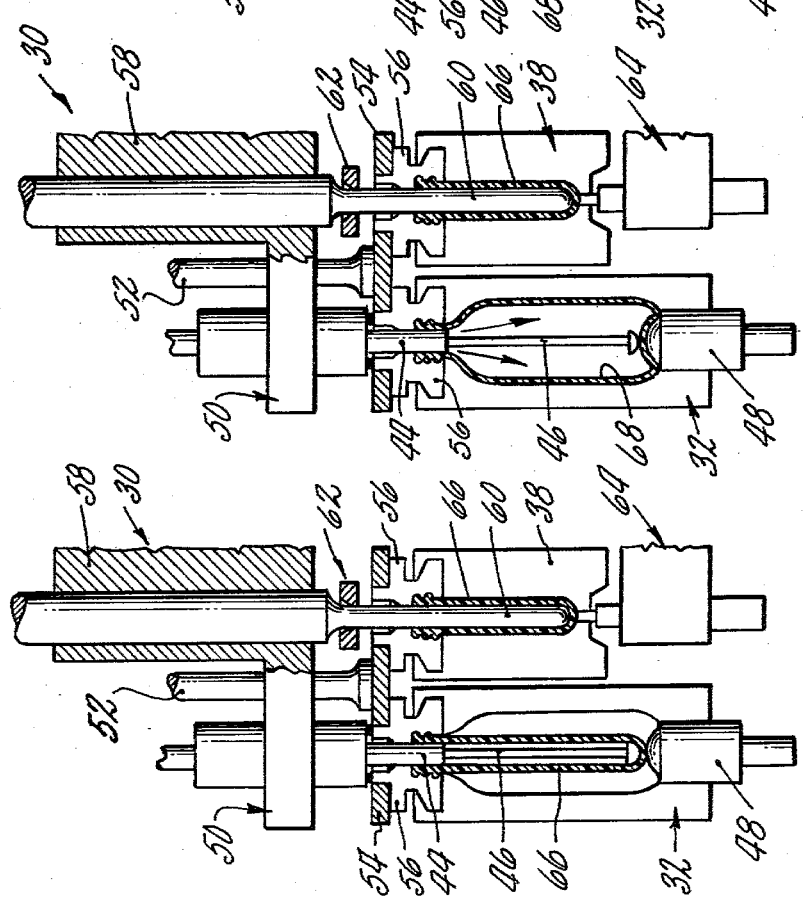

At this time the formation of the parison 66 in the second parison mold has been completed. The stretch rod 46 is now moved upwardly out of the bottle 68 and the bottom plate 48 is retracted, as shown in FIG. 22. The molds 32,38 are now opened and the carrier 50 moves to its mid-position. At this time the blow head 44 is still associated with the neck ring 56 carrying the bottle 68 and that neck ring 56 is opened so that the blow molded bottle 68 may be ejected as shown in FIG. 23 into a convenience takeaway chute or the like (not shown). The core rod 60 is then retracted as is shown in FIG. 17, and the newly formed parison 66 is carried by its associated neck ring 56 to the blow position of FIG. 18 and the cycle repeated.

Referring now to FIG. 1, it will be seen that the molding machine 30 includes a suitable base 72 having mounted on one end portion thereof a conventional plastic material extruder, generally identified by the numeral 74 including a hopper 76. On the other end of the base 72 is mounted a mold assembly 10 and the tooling relating thereto. It is to be understood that the extruder 74 will be suitably coupled through an injection carriage 71 with rocking pivot 73 and cylinder mechanism 75 to the injection apparatus 64 for delivering plastic material thereto.

The mold components include a vertically disposed fixed platen 78 which, as above stated, carries the fixed halves of molds 32, 38 and an end support 80. Extending between the platen 78 and the end support 80 are mounting bars 82 arranged in upper and lower sets. A movable platen 84 which, as above stated, carries the movable halves of molds 32, 38 is mounted on the bars 82 for movement toward and away from the fixed platen 78.

Carried by the fixed platen 78 is an upstanding support 86. A similar support 88 is carried by the upper supports of the bars 82. Extending between the supports 86, 88 is a pair of guide bars 90 on which a portion of the carrier 50 is mounted for movement.

Figure 3:
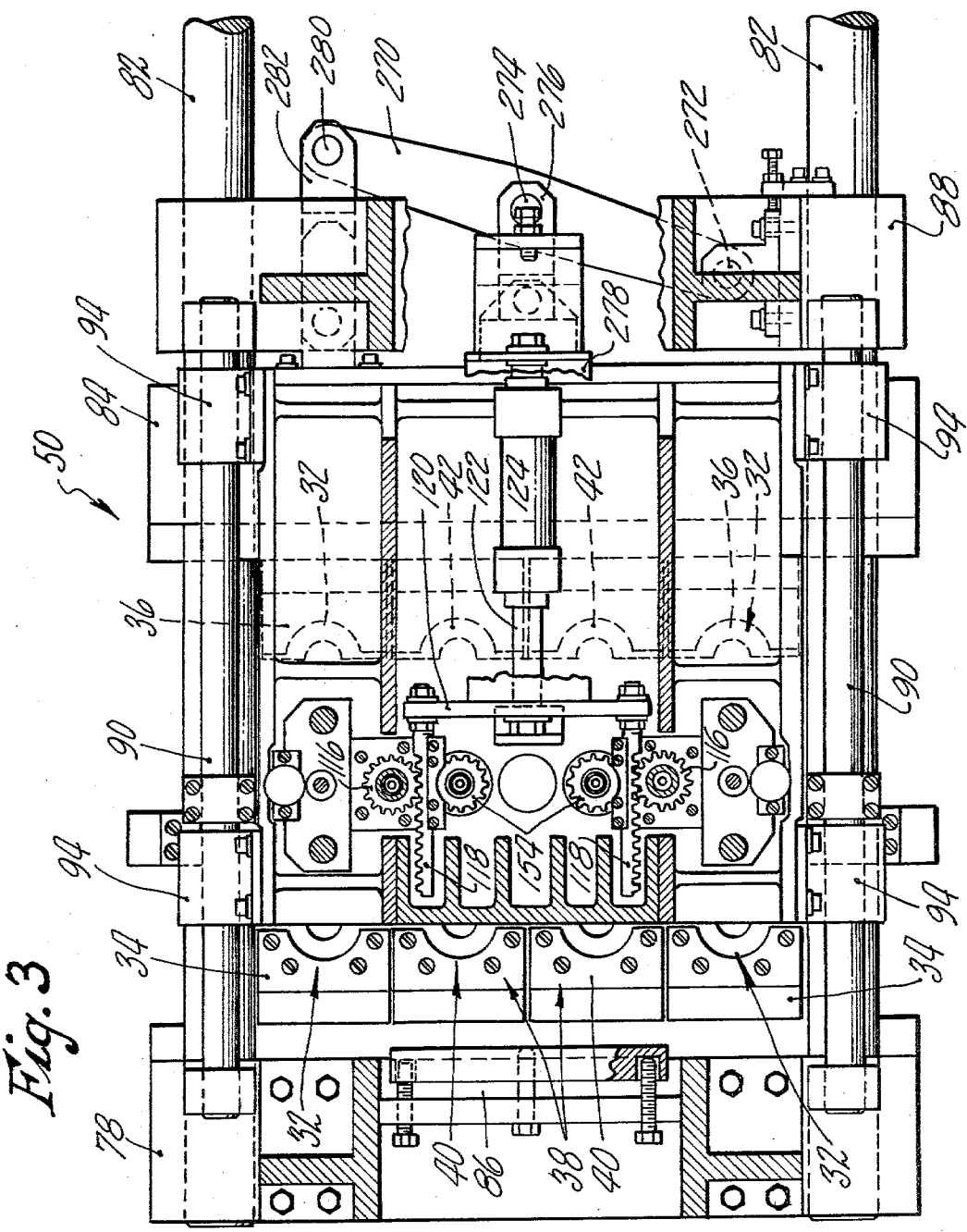
FIG. 3 is a horizontal sectional view taken generally along the line 3—3 of FIG. 2 and shows more of the working details of the molding machine.
Figure 8:
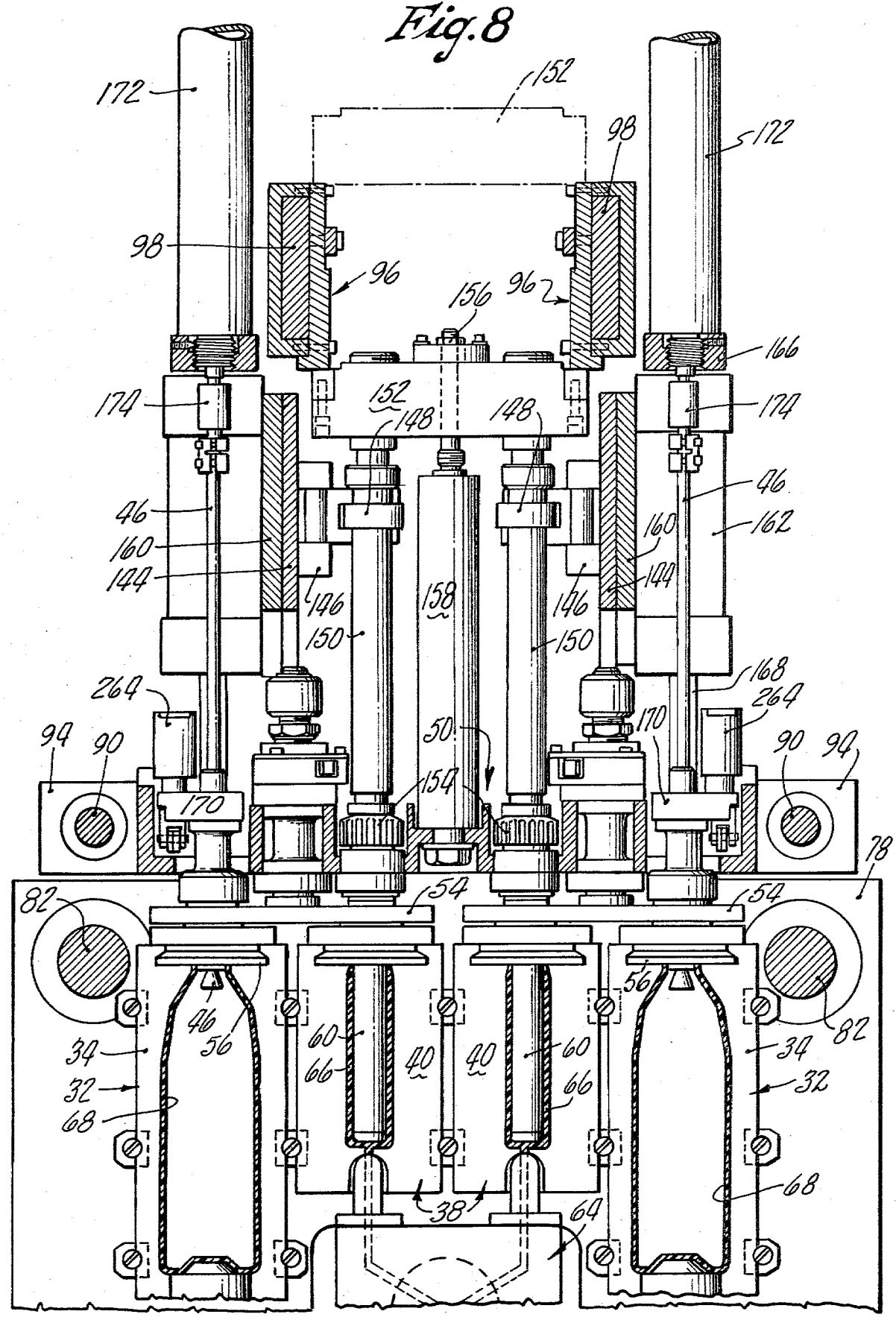
FIG. 8 is an enlarged transverse sectional view taken through the molding machine along the parting lines of the molds.

In the preferred embodiment of the invention there will be two sets of blow molds 32 and parison molds 38, or a multiple thereof. The preferred arrangement is best shown in FIGS. 3 and 8. It is to be noted that the parison molds 38 are positioned adjacent one another. The parison mold halves 34 and 40 are fixedly secured to the fixed platen 78 while the blow mold halves 36 and 42 are fixedly secured to the movable platen 84 for movement therewith. It is also to be noted that the extrusion apparatus 64 is positioned for simultaneous cooperation with the two parison molds 38. The two supports 54 each carry a pair of neck rings 56. Further, as apparent, carrier 50 is mounted on the bars 90 by means of guide blocks 94 for movement.

Referring now primarily to FIG. 9, it will be seen that each support 54 is carried by a vertical shaft 100 which extends through carriage 50 and is rotatably journalled relative thereto by means of bearings 102,104. The shaft 100 is hollow and has an axial bore 106 therethrough, which, together, in conjunction with a sleeve 108 define a pair of concentric fluid passages which open into the support 54 and to which may be coupled suitable lines (not shown) connected to the halves of each of the split neck rings 56 carried by the support 54. A suitable fitting 110 closes the upper end of the shaft 100 with the fitting 110 having an inlet 112 and an outlet 114 to which suitable coolant fluid lines (not shown) may be coupled.

In order that the shaft 100 and the support 54 carried thereby may be indexed, above the bearing 104 the shaft 100 is provided with a pinion 116 with which there is engaged a rack 118. As is best shown in FIG. 3, there are a pair of the racks 118 which are interconnected by a bar 120 which, in turn, is carried by a piston rod 122 of an extensible fluid motor 124 mounted on carriage 50. It will be apparent that when the racks 118 are moved in one direction, the support 54 is rotated in a first direction with the extent of rotation being 180°. Then when the racks 118 are moved in the opposite direction, the supports 54 are rotated in a reverse direction through a like angle of 180° to their original positions.

Referring now to FIGS. 9, 11 and 13–15, it will be seen that each neck ring 56 is of a split construction and includes a pair of halves 126 the upper portions of which are generally rectangular in outline. The lower portions of the neck ring halves 126 are, of course, of a configuration to interlock with the upper portions of the molds 32,38 in the manner generally shown in FIG. 9. The upper portions of the neck ring halves 126 are interconnected by elongated rods 128 on which there are mounted springs 130. As will be apparent from FIG. 14, the springs 130 function to maintain the neck ring halves 126 closed under normal conditions.

Figure 13:
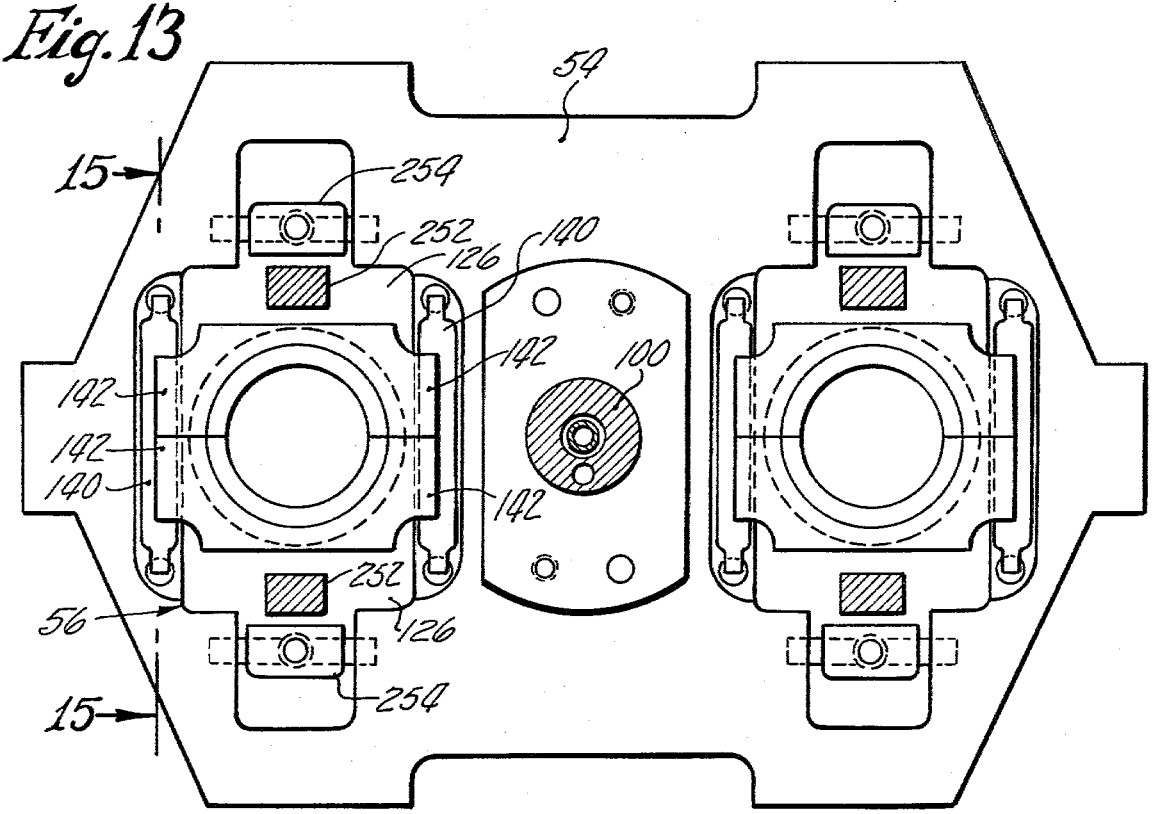
FIG. 13 is an enlarged fragmentary horizontal sectional view taken generally along the line 13—13 of FIG. 9 and shows the details of a support for two neck rings and the mounting of the neck rings in the support.
Figure 14:
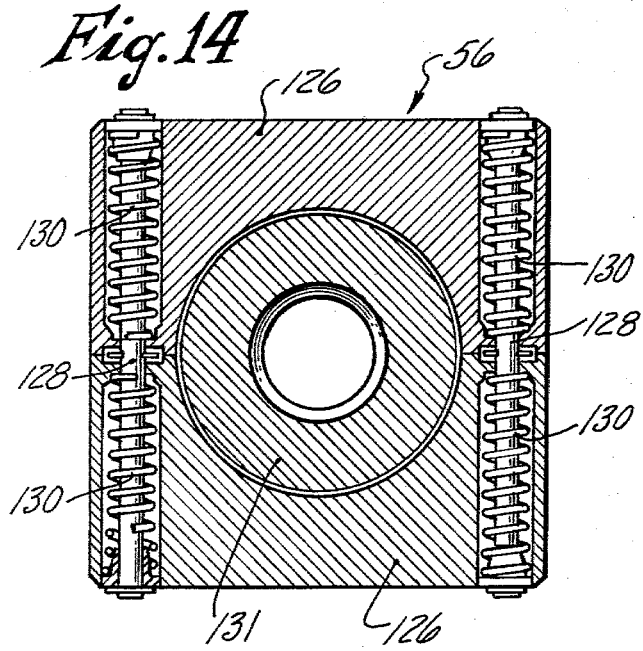
FIG. 14 is an enlarged fragmentary horizontal sectional view taken along the line 14—14 of FIG. 9 and shows the specific retention of a neck ring in its closed state by springs and the relationship of a guide carried thereby.
Figure 15:
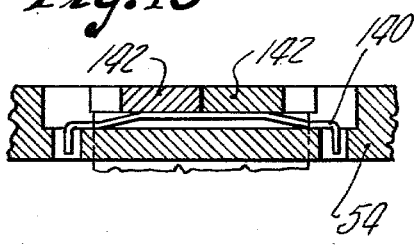
FIG. 15 is an enlarged fragmentary longitudinal vertical sectional view taken generally along the line 15—15 of FIG. 13 and shows further the details of one of the neck rings.

As is shown in FIGS. 9 and 13, the neck ring halves 126 are generally interlocked with the support 54 for both relative vertical movement and relative transverse movement, the transverse movement permitting the opening of the neck ring halves 126 sufficiently to disengage a blown bottle therefrom. Although a specific connection between the neck ring halves and the support 54 has been illustrated in FIG. 13, it is to be understood that these may be varied without departing from the invention.

Figure 11:
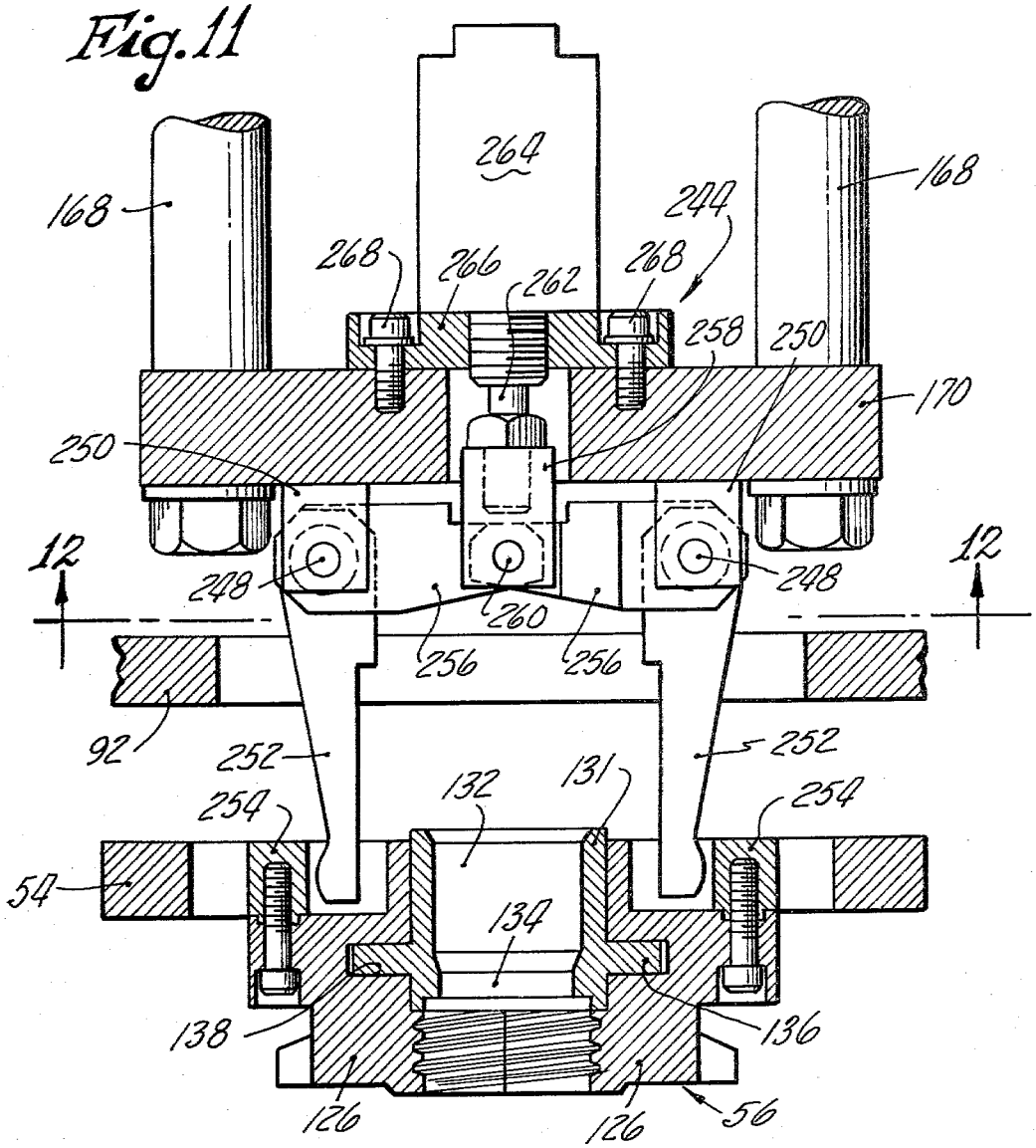
FIG. 11 is an enlarged fragmentary longitudinal sectional view taken generally along the line 11—11 of FIG. 9 and shows the details of a mechanism for opening a neck ring.

As is best shown in FIGS. 9 and 11, each neck ring 56 has the lower inner portion thereof configurated to define a threaded neck finish on a bottle or the like. Mounted within each of the neck rings 56 above this configurated portion thereof is a guide ring 131. The ring 131 has a bore 132 therethrough which terminates in a reduced diameter lower bore 134. The guide ring 131 is provided with a flange 136 which is received in an annular recess 138 in the neck ring 56 so as to locate and align it while permitting the opening and closing of the neck ring. The mounting of each neck ring 56 is such that it is resiliently urged toward an upper position. To this end, the support 54 carries at opposite sides of the neck ring 56 a pair of leaf springs 140 which are floatingly mounted relative to the support 54 in the manner shown in FIG. 15. The neck ring halves 126 each include flange portions 142 which overlie the springs 140 and are slidable thereon during the opening movement of the neck ring.

Figure 2:
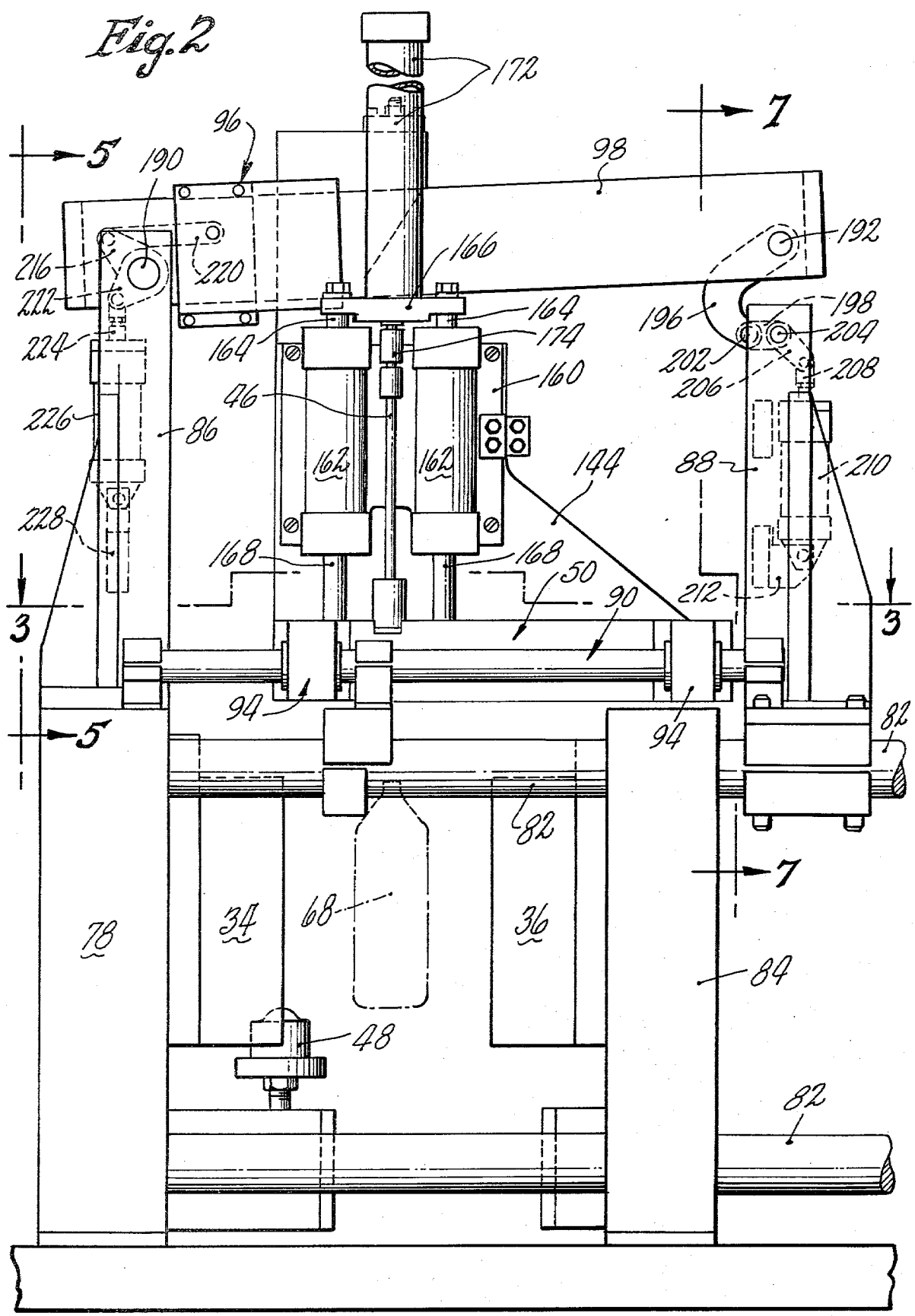
FIG. 2 is a fragmentary longitudinal view taken through the molding machine in its open state and shows generally the arrangement of the components thereof.

As is most clearly shown in FIGS. 2 and 8, the carriage 50 includes a pair of side plates 144 which extend longitudinally of the carriage 50. The side plates 144 carry brackets 146 which, in turn, carry upper guides 148 for extensions 150 of the core rods 60. The extensions 150 have their upper ends connected to a transverse connecting bar 152. Carried by the carrier 50 are lower guides 154 which are of an adjustable construction, as is generally shown in FIG. 9. It is to be understood that the guides 148,154 permit adjustment of core rods 60 in the X and Y plane so that the core rods 60 always remain in perfect alignment with the parison molds 38. For a more complete description of a suitable core rod adjusting mechanism see Harry M. Cargile copending application U.S. Ser. No. 863,747 filed Dec. 23, 1977, commonly assigned.

Core rods 60 are each of a hollow construction so as to define therein suitable fluid passages whereby the temperature of parison 66 molded thereabout may be controlled. Core rods 60 are further guided with respect to the neck rings 56 and the parison molds 38 by the guide rings 131.

Bar 152 is carried by a piston rod 156 of an extensible fluid motor 158 which is fixedly carried by the carriage 50 in an upstanding position. It is to be noted that when the bar 152 is in its lowermost position, it is held down and further positioned by means of slide blocks 96.

Carried by each of the plates 144 is a mounting plate 160. Each of the mounting plates 160, as shown in FIG. 2, carries a pair of extensible fluid motors 162. The fluid motors 162 are doubled ended and include upper piston rods 164 which are connected together by a bar 166. Extending out of the lower ends of the motors 162 are piston rods 168 which are connected to a connecting bar 170. The bar 166 carries an extensible fluid motor 172 which includes a piston rod 174 which, in turn, is coupled to the upper end of the respective stretch rod 46.

Referring primarily to FIG. 9, it will be seen that the bar 170 carries a housing 176, the upper part of which functions as at 178 as a guide for the stretch rod 46. Carried by the intermediate part of the housing 176 is the upper end of the respective blow head 44. Carried by the lower portion of the housing 176 is a sealing sleeve 180 which carries a seal 182 forming a seal with the housing 176 and a seal 184 for forming a seal with the associated guide ring or sleeve 131.

It is to be noted that the blow head 44 has a bore 186 therethrough of a scalloped configuration, as is best shown in FIG. 10, to guide the stretch rod 46. Air under pressure is directed around the stretch rod 46 down into the parison to blow the parison into the bottle configuration to form the bottle 68; alternatively, air can be directed through the stretch rod or around and through the stretch rod.

Referring primarily to FIGS. 2, 4, 5, 7 and 8 it will be seen that locking bars 98 for locking the machine assembly into operating position are pivotally mounted on a transverse shaft 190 carried by the support 86. Thus bars 98 may pivot up and down to move the separately formed slide block 96 up and down to clamp or lock bar 152 in its lowermost position to thus position the core rods 60 against upward movement.

Figure 7:
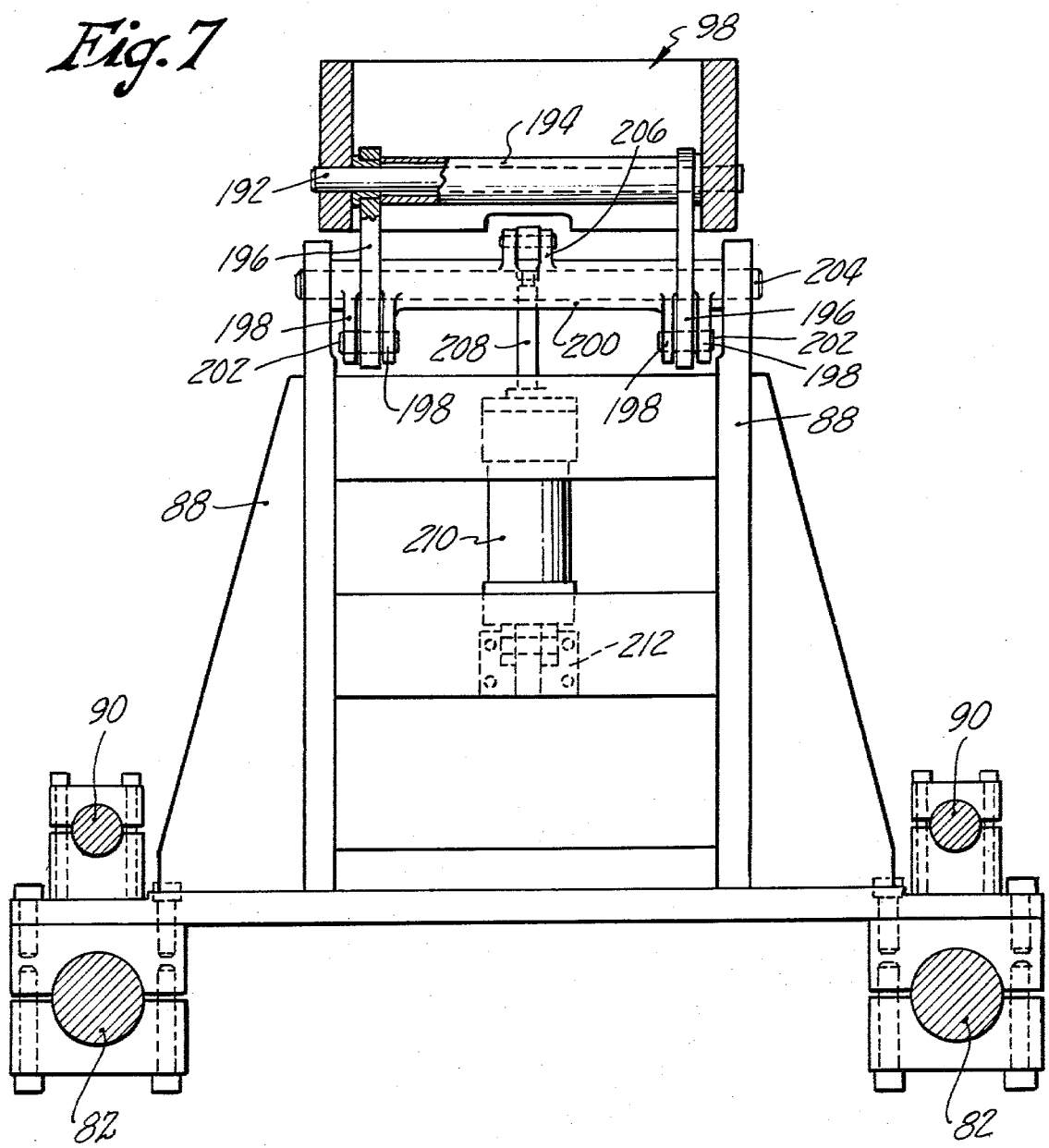
FIG. 7 is an enlarged fragmentary sectional view taken along the line 7—7 of FIG. 2 and shows the mounting of a guide rail system for the locking beam for fixed vertical displacement.

The right end of bar 98, as is most clearly shown in FIGS. 2 and 7, has a shaft 192 extending thereacross with the shaft carrying a sleeve 194 to which, in turn, a pair of J-shaped links 196 are fixedly secured. The links 196, in turn, are connected to arms 198 carried by a sleeve 200 by means of pivots 202. The sleeve 200 is mounted on a shaft 204 carried by the support 88.

The sleeve 200 also has arms 206 to which there is connected the upper ends of a piston rod 208 of an extensible fluid motor 210 which is pivotally mounted on a mounting bracket 212 carried by the support 88. It will be seen that extension and retraction of the piston rod 208 will effect the lowering and raising of locking bar 98 to raise and lower slide beams 96 carried thereby.

Figure 4:
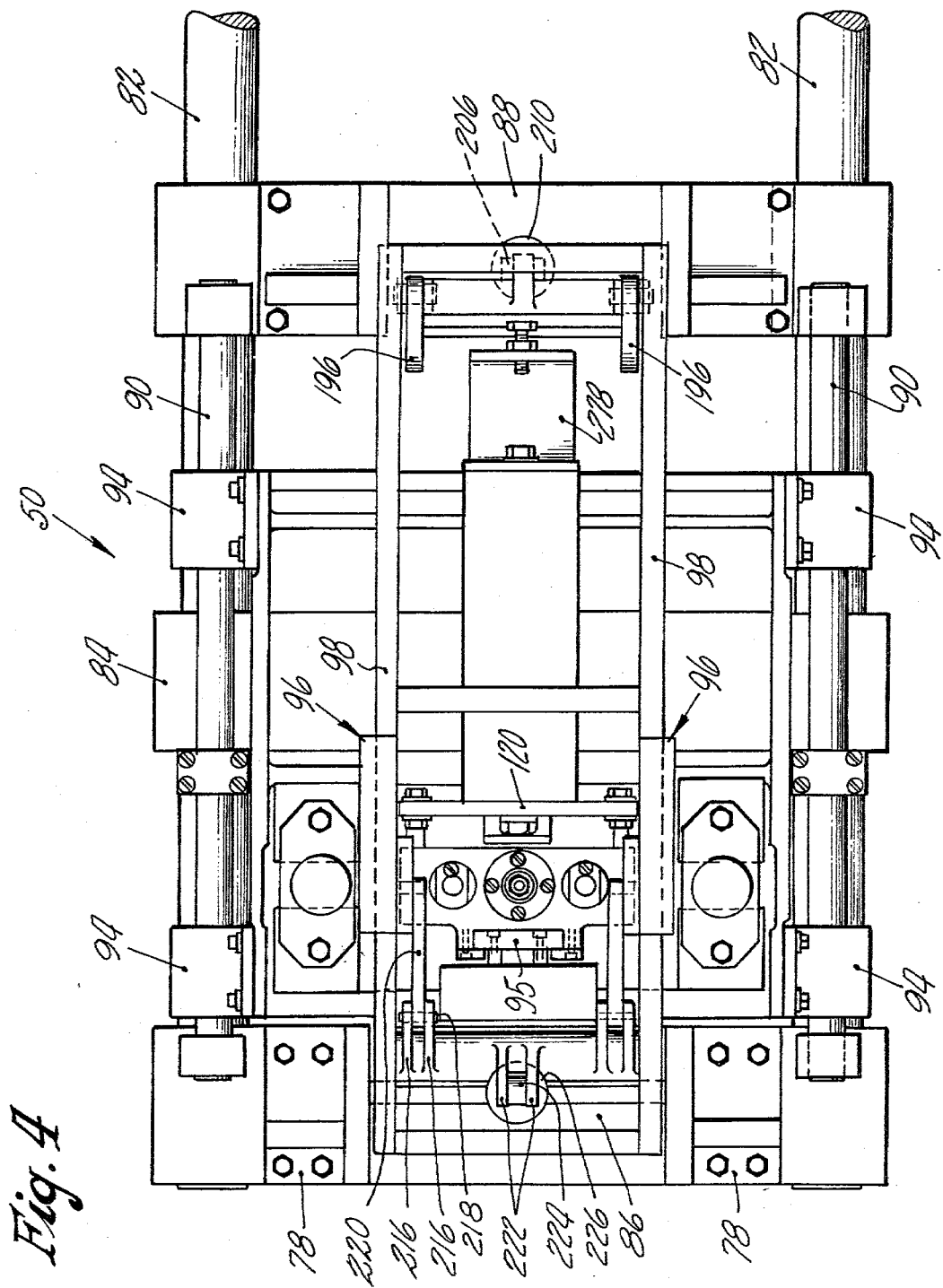
FIG. 4 is a top plan view of that portion of the molding machine shown in FIG. 2 and shows further the details thereof.
Figure 5:
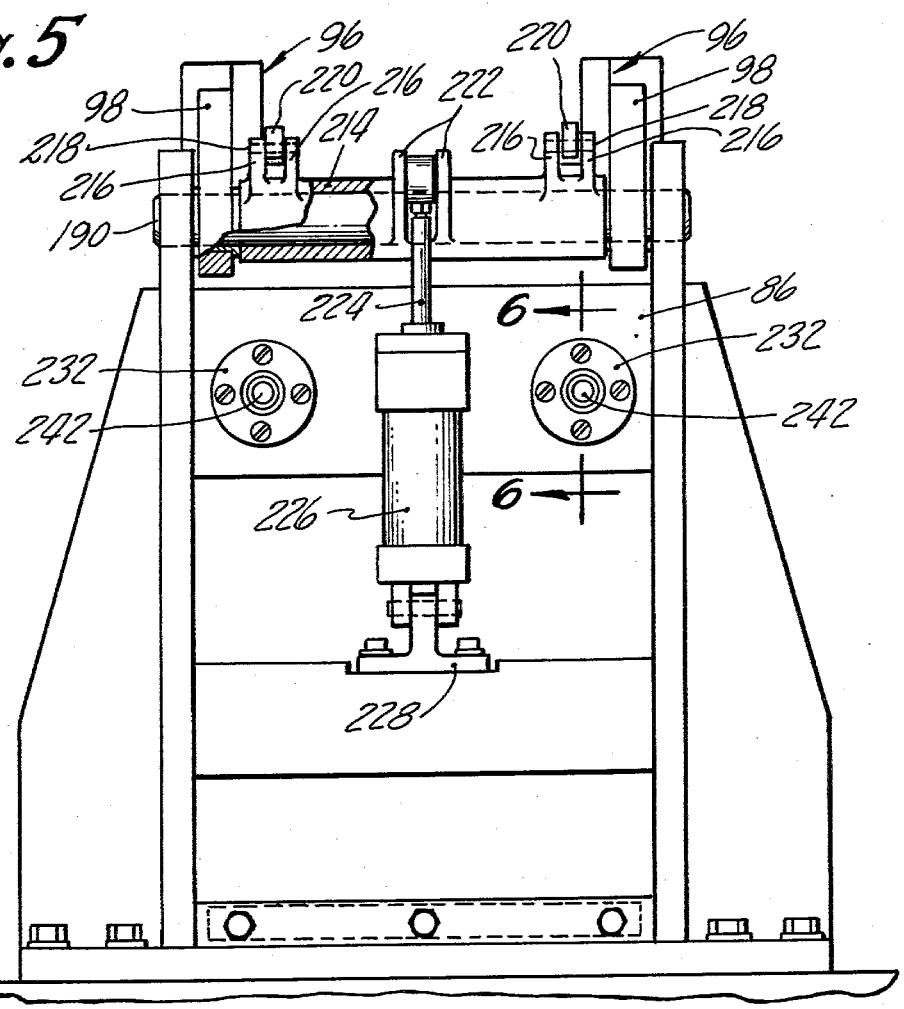
FIG. 5 is an enlarged fragmentary end elevational view taken generally along the line 5—5 of FIG. 2 and shows the mechanism for shifting an upper carrier.

Referring primarily to FIGS. 2, 4 and 5, it will be seen that the shaft 190 carries a sleeve 214 having arms 216 at opposite ends thereof. The arms 216 have pivotally connected thereto by way of pivots 218, links 220. The links 220, in turn, are pivotally connected to the beams 96. Sleeve 214 also has a central pair of arms 222 to which is connected the upper end of a piston rod 224 of an extensible fluid motor 226 which is mounted on the support 86 by means of a suitable bracket 228 for relative pivotal movement. It will be seen that when the piston rod 224 is moved downwardly, as shown in FIG. 2, the sleeve 214 is rotated in a counterclockwise direction, withdrawing the sliding block 96. When the piston rod 224 is extended, the blocks 96 advance. Thus blocks 96 can be retracted from their positions overlying the bar 152 and the bar 152 is free to move upwardly to its guide line positions of FIG. 8. However, when the bar 152 is down and the blocks 96 are advanced, the block will overlie the bar 152 and when locking bar 98 is lowered, the block 96 will accurately position the bar 152 and provide down thrust to core rods 60.

Figure 6:
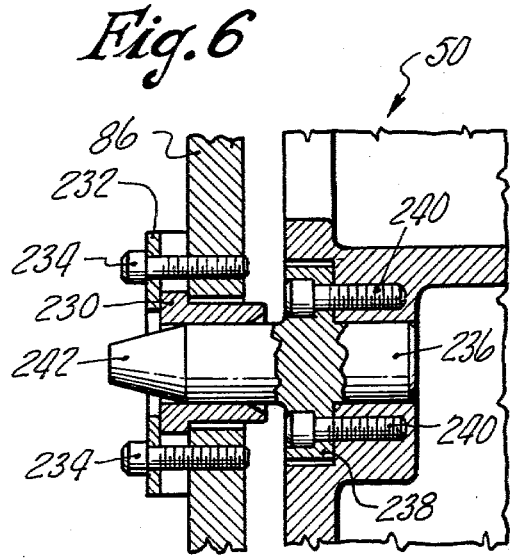
FIG. 6 is an enlarged fragmentary vertical sectional view taken along the line 6—6 of FIG. 5 and shows the relationship of means for aligning a movable carriage of the machine with a fixed platen thereof.

Referring primarily to FIG. 6, it will be seen that means are provided to assure proper alignment of the carriage 50 with the fixed mold halves in the closed position of the molding machine. An upper part of the support 86 carries a pair of guide sleeves 230 which are clamped in adjusted positions by means of clamp plates 232 held in place by screws 234. The carriage 50, in a like manner, carries a pair of guide pins 236 which are provided with mounting flanges 238 and which are secured in place by means of fasteners 240. Each guide pin 236 is provided with a frustoconical nose 242 to facilitate the entry thereof into the guide sleeve 230.

Figure 12:
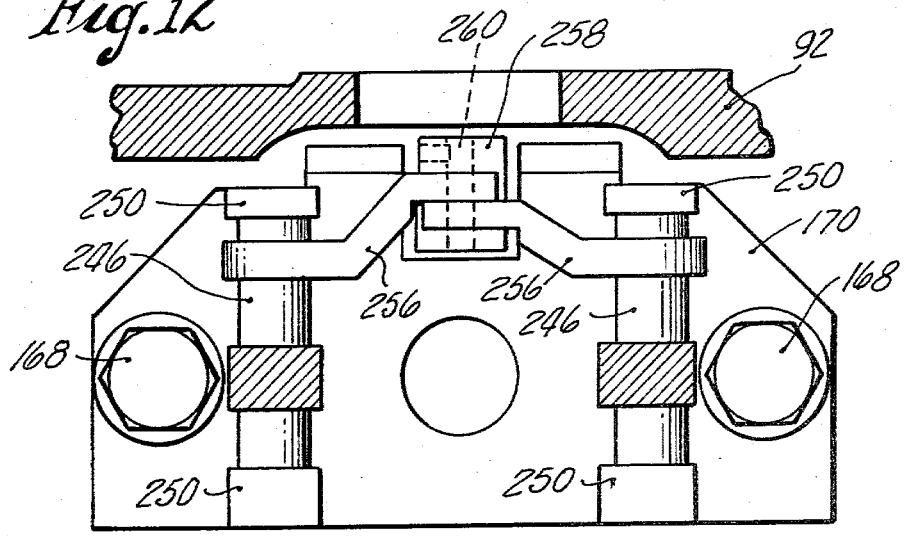
FIG. 12 is a fragmentary horizontal sectional view taken along the line 12—12 of FIG. 11 and shows further the details of the neck ring opening mechanism.

Referring primarily to FIGS. 9, 11 and 12, it will be seen that each bar 170 carries a neck ring opening device, generally identified by the numeral 244. The device 244 includes a pair of sleeves 246 rotatably journalled on shaft 248 carried by blocks 250 depending from the bar 170. Each sleeve 246 has an arm 252 depending therefrom. The arms 252 are positioned to engage blocks 254 secured to the neck ring halves 126 in the positions best illustrated in FIG. 13.

The sleeves 246 also carry offset arms 256 which are connected to a yoke 258 by means of a pivot pin 260. The yoke 258, as is best shown in FIG. 11, is carried by a piston rod 262 of an extensible fluid motor 264 which has a base 266 secured to the bar 170 by means of fasteners 268.

Referring now primarily to FIG. 3, it will be seen that the movable platen 84 and the carriage 50 are interconnected by an elongated lever 270 which has one end pivotally mounted on a fixed pivot 272. The lever 270 has an intermediate pin 274 connected to a lever 276 which, in turn, is pivotally connected to an elongated bar 278 attached to the carriage 50.

The lever 270 has a terminal pivot 280 connected to a link 282 which, in turn, is pivotally connected to the movable platen 84.

A suitable extensible fluid motor 284 carried by the stationary platen or support 80 is suitably connected to a toggle lever 286 to provide thrusting force to operate platen 84. It will be seen that the proportions of the lever 270 are such that the carriage 50 is moved one half the distance of movement of platen 84. Thus the carriage 50 always maintains an intermediate position relative to the stationary platen 78 and the movable platen 84.

A suitable programmer may be provided to actuate valving in sequence so as to actuate the various fluid motors of the machine. However, since these are conventional and in and of themselves form no part of this invention, no effort has been made to illustrate or describe these controls.

Accordingly, the present invention provides an apparatus for formation of injection molded parisons utilizing a core rod mechanism in their formation and formation of biaxially oriented bottles from the parisons utilizing a stretch rod mechanism in the formation in a continuous process. The process is synchronized so that, after a first parison of the operation is formed, another parison is formed simultaneously with each blowing of a bottle. The described machine system and process utilizes a floating neck ring assembly for each parison and blow mold which is positioned and locked first within a parison mold during the parison formation and then, after transfer of the parison carried by the neck ring to the blow mold, within a blow mold during blowing of the bottle. The neck ring, therefor, controls the parison during its formation and the blowing thereof. Guide means are provided for positioning each of the core rod assembly and stretch rod assembly utilized in the formation of the parison and blown bottle from the parison in properly adjusted and aligned position during operation. The machine assembly also includes means for the synchronous movement of stationary and fixed platens in combination with the movement of the core rod and blow mold components into and out of operation position. Automatic locking of the various components into operative position during the parison and blow mold steps is provided through the alignment of the cooperative parts as illustrated in the drawing. The entire mechanism and process permits an efficient and simplified formation of plastic bottles.

Although only a preferred embodiment of the molding machine has been specifically illustrated and described herein, it is to be understood that variations may be made in the molding machine without departing from the spirit and the scope of the invention as defined by the appended claims.

It is claimed:

1. A hollow article molding machine comprising a split parison mold; core rod means for removable insertion into said parison mold to form a parison cavity; means for injecting a moldable material into said parison cavity; blow mold means; blow head means for removable engagement with said blow mold; means for moving said core rod means into and out of said parison mold; means for moving said blow head means into and out of engagement with said blow mold; a pair of split neck rings; a support carrying said neck rings; means for moving said neck ring support for alternating cooperation of said neck rings with said parison mold and said blow mold and for transferring a molded parison from said parison mold to said blow mold; a first platen carrying at least one parison mold half and at least one blow mold half in side-by-side relation; a second platen carrying the other parison mold half and the other blow mold half in mirror image side-by-side relation; means mounting said platens for relative movement to open and close said molds in unison; and mounting means positioned between said platens mounting said core rod means; blow head means; and means for moving core rod means and blow head means.

2. The molding machine of claim 1 wherein said mounting means mount said support for said neck rings for rotation about an axis disposed between said parison mold and said blow mold.

3. The molding machine of claim 2 wherein said means for moving said neck ring support include drive means coupled to said support for first rotating said support in a first direction during one actuation of the molding machine and then rotating said support in a second and opposite direction during the next actuation of the molding machine back to its starting position.

4. The molding machine of claim 3 wherein said drive means includes a pinion connected to said support, a rack engaged with said pinion, and means for reciprocating said rack in timed relation to the opening and closing of said molds.

5. The molding machine of claims 2 or 3 wherein there are means for opening said neck ring carrying a molded article when said neck ring is in an intermediate position.

6. The molding machine of claim 1 wherein said blow head forms eject means for ejecting a blown article from an associated neck ring.

7. The molding machine of claim 1 wherein one of said platens is fixed; means mounting said mounting means for movement relative to said fixed platen, and in the open position of said molds, said mounting means is in an intermediate position spaced between said platens.

8. The molding machine of claim 7 wherein an injection device is associated with that parison mold half carried by said fixed platen.

9. The molding machine of claim 7 wherein said core rod means is carried by said mounting means for movement through one of said neck rings into said parison mold.

10. The molding machine of claim 9 wherein said blow head is fixed on said mounting means for association with a neck ring.

11. The molding machine of claim 7 wherein said blow mold is of a configuration to define a blown article having a configurated bottom, there is a movable bottom wall permanently associated with said blow mold half carried by said fixed platen, and there are means mounting said bottom wall for movement to a retracted position to release a blown article.

12. The molding machine of claim 7 wherein a blow head is carried by said mounting means for sealing relative to a parison positioned within said blow mold when closed.

13. The molding machine of claim 1 wherein each neck ring includes means mounting the same in said support for floating axial and transverse movement.

14. The molding machine of claim 1 wherein each neck ring includes means mounting the same in said support for opening movement, spring means normally retaining each neck ring closed, and opening means for opening a neck ring carrying a molded article.

15. The molding machine of claim 14 wherein said opening means are carried by an axially movable support member, and said support member also carries said blow head.

16. The molding machine of claim 1 wherein said mounting means includes a movable first carriage, a shaft carrying said neck ring support rotatably journalled in said carriage, a guide for said core rod carried by said first carriage, and a movable second carriage mounted above said first carriage for locking said core rod in position.

17. The molding machine of claim 16 wherein said second carriage is movable generally axially of said core rod relative to said first carriage.

18. The molding machine of claim 16 wherein means for opening said neck rings are carried by said first carriage.

19. The molding machine of claim 16 wherein each neck ring carried a guide for centering said core rod and said blow head.

* * * * *